Feb. 21, 1956  J. E. NORMAN  2,735,642
FLUID FLOW REGULATING VALVE
Filed June 8, 1951  2 Sheets—Sheet 2
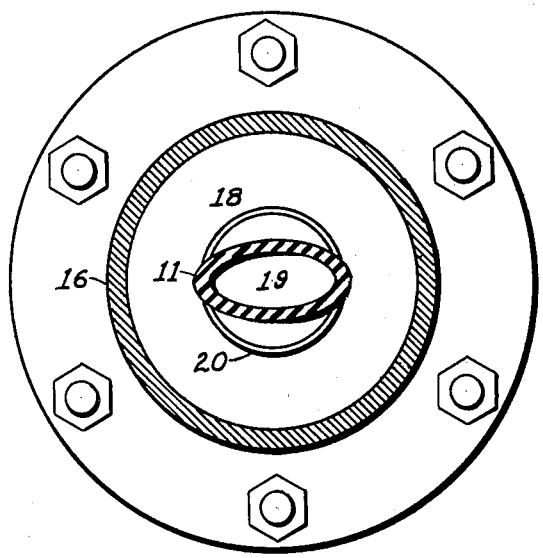
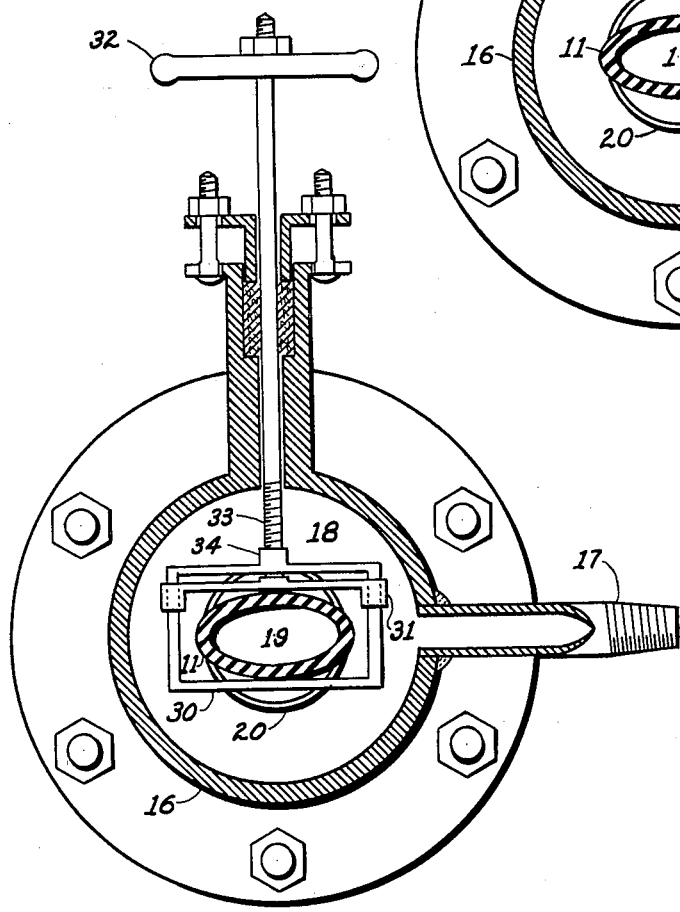
INVENTOR
james E. Norman

United States Patent Office 2,735,642
Patented Feb. 21, 1956

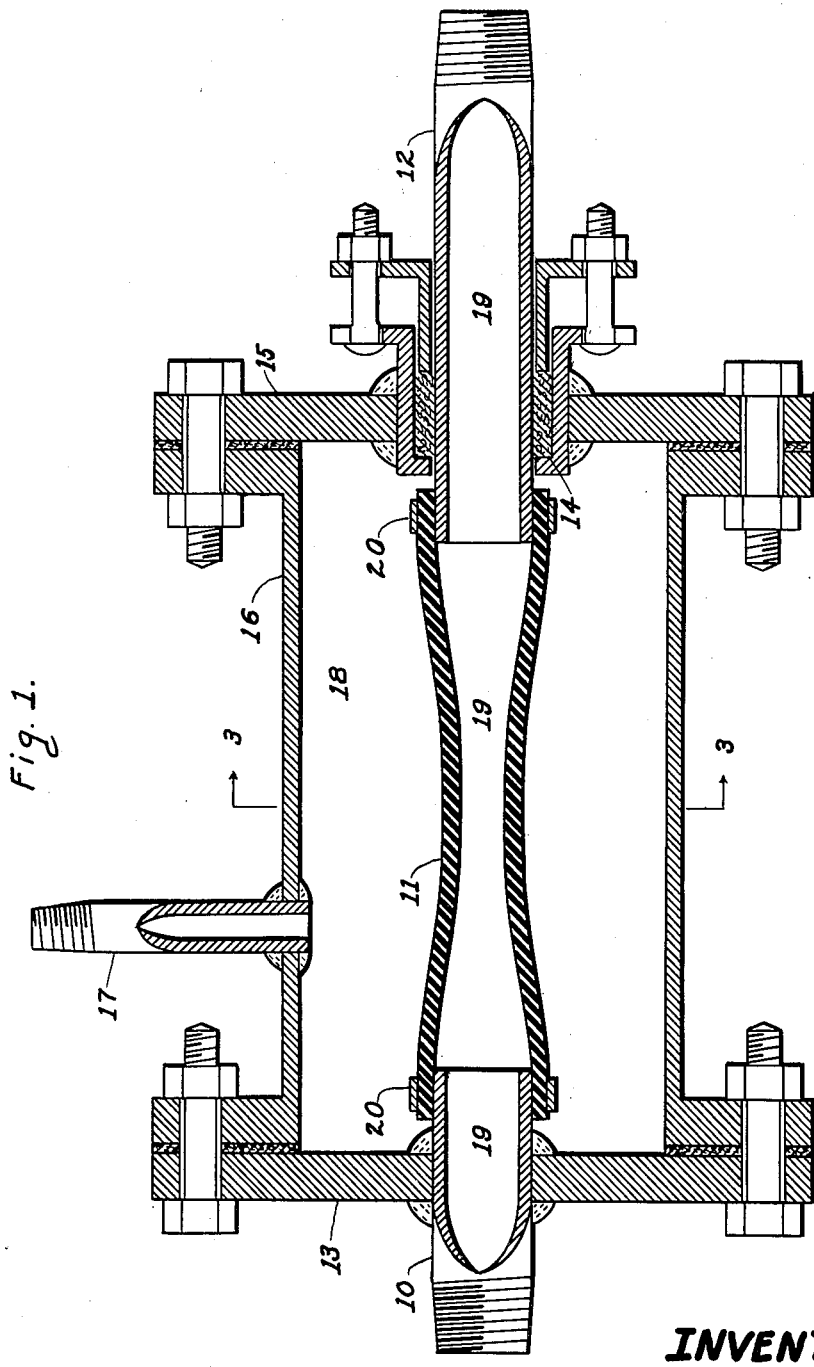

2,735,642

FLUID FLOW REGULATING VALVE

James E. Norman, Imperial County, Calif.

Application June 8, 1951, Serial No. 230,621

3 Claims. (Cl. 251—5)

The invention relates to improved means for regulating and controlling the flow of fluids.

Broadly stated, it is the primary object of the present invention to provide a novel and improved form of regulating valve whereby the flow of fluids may be regulated by remote control through the use of an independent fluid pressure system.

An important object of the invention is to control the flow of fluids transporting suspended solid matter in such a manner as to prevent the constriction of the regulating device by accumulation of solid matter in the device.

Other objects and advantages of the invention will be apparent from the following specification and the accompanying drawings wherein there is described and shown an embodiment of the selected form of invention.

In the embodiment as herein shown in the drawing:

Fig. 1 is a cross sectional view through the center or axis of a device embodying my invention.

Fig. 2 is a transverse cross sectional view taken on line 3—3 of Fig. 1.

Fig. 3 is a transverse cross sectional view of a variant of the device shown in Fig. 1.

In the construction shown in Figs. 1 and 2, pipe 10, flexible tube 11, and pipe 12 form the conduit 19 through which the fluid to be controlled is caused to flow. Pipe 10 is welded or otherwise affixed to flange 13. Pipe 12 passes through stuffing box 14 mounted in flange 15, the purpose of said stuffing box being to facilitate assembly of the device. Flanges 13 and 15 are affixed to the companion flanges of body piece 16 in the conventional manner, so as to form a pressure tight chamber 18 surrounding flexible tube 11. Pipe 17 is welded or otherwise affixed to body piece 16 so as to provide an inlet to the pressure tight chamber. Straps 20 bind the flexible tube firmly to pipes 10 and 12.

The flexible tube 11 may be either circular or substantially elliptical in cross section. I prefer the elliptical cross section, particularly in the larger sizes of the device. Further, depending on the manner in which the device is to be operated, the flexible tube may be either semi-pliable so as to require substantial pressure to cause it to collapse, or very pliable so that it will collapse readily upon the application of slight pressure to chamber 18.

In operation, fluid is caused to flow through conduit 19 in either direction. Independent fluid pressure is applied to chamber 18 through pipe 17 by means of either gaseous or liquid medium. The pressure in chamber 18 acts to collapse flexible tube 11. The extent of the constriction of conduit 19 is a function of the amount of pressure applied to chamber 18. The extent of constriction of conduit 19 governs the cross sectional area of the conduit, thereby governing the rate of flow of fluid through the conduit. The amount of pressure so applied to chamber 18 may be varied at will by means of any conventional device suitable for this purpose. The device by means of which the pressure is varied and adjusted may be located at any convenient station, either near to or remote from the flow regulating valve.

In the form of the invention employing the semi-pliable form of flexible tube 11, the fluid flow through conduit 19 exerts no perceptible effect on the cross sectional area of the conduit. The velocity of flow of fluid through the conduit does not affect the operating characteristics of the device. The quantity of fluid which passes through this form of the invention is governed by the extent of constriction of flexible tube 11.

In the form of the invention employing the pliable form of flexible tube 11, the flow of fluid through conduit 19 causes a reduction of pressure in the conduit, resulting from the conversion of pressure head to velocity head according to Bernouilli's theorem. The drop in pressure in conduit 19 causes pressure in chamber 18 to act to collapse the very pliable flexible tube 11. The collapse of flexible tube 11 stops the fluid flow through conduit 19. The interruption of flow causes velocity head of fluid in the conduit to be converted back to pressure head. The sudden increase in pressure in conduit 19 causes flexible tube 11 to re-open, flow starts through the conduit again, and the cycle is repeated. The result of the cyclic process is to cause fluid to pass through conduit 19 in a pulsating stream. The alternate opening and closing of flexible tube 11 prevents a build up of transported solids in the conduit. Since there is no other point of constriction of flow in the system to give rise to accumulation of transported solids, flow may be maintained indefinitely at a substantially constant over all rate.

As an alternative to the method of operation just described, a pulsating or alternating pressure impulse may be created externally and independently of the regulating valve and applied by connection through inlet pipe 17 to the pressure chamber 18. The impulse causes flexible tube 11 to open and collapse with the pulse thus created, providing external independent control of the pulse cycle of the regulating valve.

Another embodiment which is similar in operation to that just described is shown in Fig. 3. In this form of the invention a clamp composed of frame 30 and bar 31, positional normal to the axis of flexible tube 11, acts as an adjusting device to limit the extent of opening of flexible tube 11, in the open portion of the pulse or cycle of operation. Pulsating flow through conduit 19 may be obtained over a wider range of flow rates than is possible without control of the maximum opening of the flexible tube. The extent of opening of the flexible tube permitted by the clamp is readily adjustable by means of hand wheel 32 acting on screw thread 33 in nut 34.

It is to be understood this specification and the drawings illustrate some preferred forms of the invention, but that the invention it not restricted to those particular forms.

The invention claimed is:

1. A fluid flow regulating valve comprising a section of pliable tube connected in a fluid conduit, a substantially constant independent fluid pressure being applied to the external surface of the pliable tube, the flexibility of the tube and the independent fluid pressure being correlated to the static pressure in the tube for any predetermined flow condition so that collapse of the tube will result due to decrease in the static pressure resulting from increase in said predetermined rate of flow whereby the flow is sufficiently arrested to increase the static pressure in the tube to thereby expand the tube to provide for the predetermined flow condition and subsequent collapse of the tube whereby a pulsating character is imparted to flow within said fluid conduit.

2. The fluid flow regulating valve of claim 1 in which said substantially constant independent fluid pressure being applied to the external surface of the pliable tube is received in a casing comprising a pressure chamber within which is mounted said pliable tube.

3. The fluid flow regulating valve of claim 1 and an adjustable clamp structure exterior to said pliable tube whereby the extent of opening of said pliable tube is limited and controlled.

References Cited in the file of this patent

UNITED STATES PATENTS

| | | |
|---|---|---|
| 2,342,192 | Grigsby | Feb. 22, 1944 |
| 2,487,226 | Eastman | Nov. 8, 1949 |
| 2,518,625 | Langstaff | Aug. 15, 1950 |
| 2,519,909 | Johnson | Aug. 22, 1950 |
| 2,533,264 | Jurs | Dec. 12, 1950 |
| 2,575,240 | Thompson | Nov. 13, 1951 |
| 2,587,188 | McFadden | Feb. 26, 1952 |
| 2,590,215 | Sausa | Mar. 25, 1952 |

FOREIGN PATENTS

| | | |
|---|---|---|
| 504,449 | Germany | Aug. 8, 1929 |
| 621,883 | France | May 19, 1927 |